United States Patent
Mai

(10) Patent No.: US 7,713,054 B2
(45) Date of Patent: May 11, 2010

(54) SPLIT MOLD INSERT AND A MOLD INCORPORATING SAME

(75) Inventor: Arnold Mai, Irrel (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 281 days.

(21) Appl. No.: 11/954,509

(22) Filed: Dec. 12, 2007

(65) Prior Publication Data

US 2009/0155404 A1 Jun. 18, 2009

(51) Int. Cl.
*B29C 45/44* (2006.01)
(52) U.S. Cl. .................. 425/441; 425/442; 425/525; 425/DIG. 58
(58) Field of Classification Search .............. 425/441, 425/442, 525, 809, DIG. 58
See application file for complete search history.

(56) References Cited

U.S. PATENT DOCUMENTS

| | | | | |
|---|---|---|---|---|
| 4,715,504 A | * | 12/1987 | Chang et al. | 215/42 |
| 5,585,121 A | * | 12/1996 | Morris | 425/168 |
| 5,599,567 A | * | 2/1997 | Gellert | 425/526 |
| 5,776,518 A | * | 7/1998 | Wohlgemuth | 425/182 |
| 5,894,024 A | * | 4/1999 | Lambarth et al. | 425/525 |
| 6,799,962 B2 | | 10/2004 | Mai et al. | |
| 2006/0119003 A1 | * | 6/2006 | Miller et al. | 264/318 |
| 2006/0198974 A1 | * | 9/2006 | Miller | 428/35.7 |
| 2006/0283210 A1 | * | 12/2006 | Dubuis et al. | 65/260 |
| 2007/0212443 A1 | | 9/2007 | Li et al. | |

FOREIGN PATENT DOCUMENTS

| | | |
|---|---|---|
| CA | 2244511 C | 1/2000 |
| CA | 2547763 A1 | 6/2005 |
| CA | 2509181 A1 | 12/2006 |

* cited by examiner

*Primary Examiner*—Yogendra N Gupta
*Assistant Examiner*—Emmanuel S Luk

(57) ABSTRACT

There is provided a split mold insert and a mold stack incorporating same. The split mold insert for defining, at least partially, a neck area of a preform suitable for blow molding into a final-shaped article, in particular, is provided. The split mold insert comprises a body having (i) a cavity defining portion for defining, in use, a portion of the neck area and (ii) a top projecting portion and a bottom projecting portion located at opposite sides of the body; a first female taper portion associated with the top projecting portion; a second female taper portion associated with the bottom projecting portion; the first female taper portion and the second female taper portion for cooperating, in use, with a first male taper of a first mold component and a second male taper of a second mold component, respectively, for aligning the body into an operational configuration.

25 Claims, 4 Drawing Sheets

SPLIT MOLD INSERT AND A MOLD INCORPORATING SAME

FIELD OF THE INVENTION

The present invention generally relates to, but is not limited to, a molding system, and more specifically the present invention relates to, but is not limited to, a split mold insert and a mold incorporating same.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

As an illustration, injection molding of PET material involves heating the PET material (ex. PET pellets, PEN powder, PLA, etc.) to a homogeneous molten state and injecting, under pressure, the so-melted PET material into a molding cavity defined, at least in part, by a female cavity piece and a male core piece mounted respectively on a cavity plate and a core plate of a mold. The cavity plate and the core plate are urged together and are held together by clamp force, the clamp force being sufficient to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the molding cavity. When cooled, the molded article shrinks inside of the molding cavity and, as such, when the cavity and core plates are urged apart, the molded article tends to remain associated with the core piece. Accordingly, by urging the core plate away from the cavity plate, the molded article can be subsequently demolded by ejecting it off the core piece. Ejection structures are known to assist in removing the molded articles from the core halves. Examples of the ejection structures include stripper plates, stripper rings and neck rings, ejector pins, etc.

When dealing with molding a preform that is capable of being subsequently blown into a beverage container, one consideration that needs to be addressed is forming a so-called "neck region". Typically and as an example, the neck region includes (i) threads (or other suitable structure) for accepting and retaining a closure assembly (ex. a bottle cap), and (ii) an anti-pilferage assembly to cooperate, for example, with the closure assembly to indicate whether the end product (i.e. the beverage container that has been filled with a beverage and shipped to a store) has been tampered with in any way. The neck region may comprise other additional elements used for various purposes, for example, to cooperate with parts of the molding system (ex. a support ledge, etc.). As is appreciated in the art, the neck region can not be easily formed by using the cavity and core halves. Traditionally, split mold inserts (sometimes referred to by those skilled in the art as "neck rings") have been used to form the neck region.

With reference to FIG. 1, a section along a portion of an injection mold 50 illustrates a typical molding insert stack assembly 52 that can be arranged (in use) within a molding machine (not depicted). The description of FIG. 1 that will be presented herein below will be greatly simplified, as it is expected that one skilled in the art will appreciate configuration of other components of the injection mold 50 that will not be discussed in the following description The molding insert stack assembly 52 includes a split mold insert pair 54 that together with a mold cavity insert 56, a gate insert 58 and a core insert 60 defines a molding cavity 62. Molding material can be injected into the molding cavity 62 from a source of molding material (not depicted) via a receptacle (not separately numbered) in the gate insert 58 to form a molded article. In order to facilitate forming of the neck region of the molded article and subsequent removal of the molded article therefrom, the split mold insert pair 54 comprises a pair of complementary split mold inserts (not separately numbered) that are mounted on adjacent slides of a slide pair (not depicted). The slide pair is slidably mounted on a top surface of a stripper plate (not depicted). As commonly known, and as, for example, generally described in U.S. Pat. No. 6,799,962 to Mai et al (granted on Oct. 5, 2004), the stripper plate is configured to be movable relative to the cavity insert 56 and the core insert 60, when the mold in arranged in an open configuration, whereby the slide pair, and the complementary split mold inserts mounted thereon, can be laterally driven, via a cam arrangement (not shown) or any other suitable known means, for the release of the molded article from the molding cavity 62.

A typical neck ring insert has a body that includes a pair of projecting portions 66 that extend from a top and a bottom face of a flange portion 68. As is shown in FIG. 1, the pair of projecting portions 66 include two male tapers—a top projecting portion 66a and a bottom projecting portion 66b. This type of an arrangement is commonly known in the art as a "core lock type split mold inserts". In an alternative prior art configuration, it has been known to arrange the top projecting portion 66a as a male taper and to arrange the bottom projecting portion 66b as a female taper. This type of an arrangement is commonly known in the art as a "cavity lock type split mold inserts". In either case, within a typical prior art implementation, the pair of projecting portions 66 serves a dual function—an alignment function and a locking function (i.e. preventing lateral movement of the neck rings under injection pressure).

SUMMARY OF THE INVENTION

According to a first broad aspect of the present invention, there is provided a split mold insert for defining, at least partially, a neck area of a preform suitable for blow molding into a final-shaped article. The split mold insert comprises a body having (i) a cavity defining portion for defining, in use, a portion of the neck area and (ii) a top projecting portion and a bottom projecting portion located at opposite sides of the body; a first female taper portion associated with the top projecting portion; a second female taper portion associated with the bottom projecting portion; the first female taper portion and the second female taper portion for cooperating, in use, with a first male taper of a first mold component and a second male taper of a second mold component, respectively, for aligning the body into an operational configuration.

According to a second broad aspect of the present invention, there is provided a mold stack comprising a core insert configured to define, in use, a first portion of a molding cavity; a cavity insert configured to define, in use, a second portion of the molding cavity; a gate insert configured to define, in use, a third portion of the molding cavity; a split mold insert pair configured to define, in use, a fourth portion of the molding cavity, the split mold insert pair comprising a first split mold insert and a second split mold insert, each having: a body having (i) a cavity defining portion for defining, in use, a portion of a neck area and (ii) a top projecting portion and a bottom projecting portion located at opposite sides of the body; a first female taper portion associated with the top projecting portion; a second female taper portion associated with the bottom projecting portion; the first female taper portion and the second female taper portion for cooperating, in use, with a first male taper associated with the cavity insert and a second male taper of the core insert, respectively, for aligning the body into an operational configuration.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Figure 1:
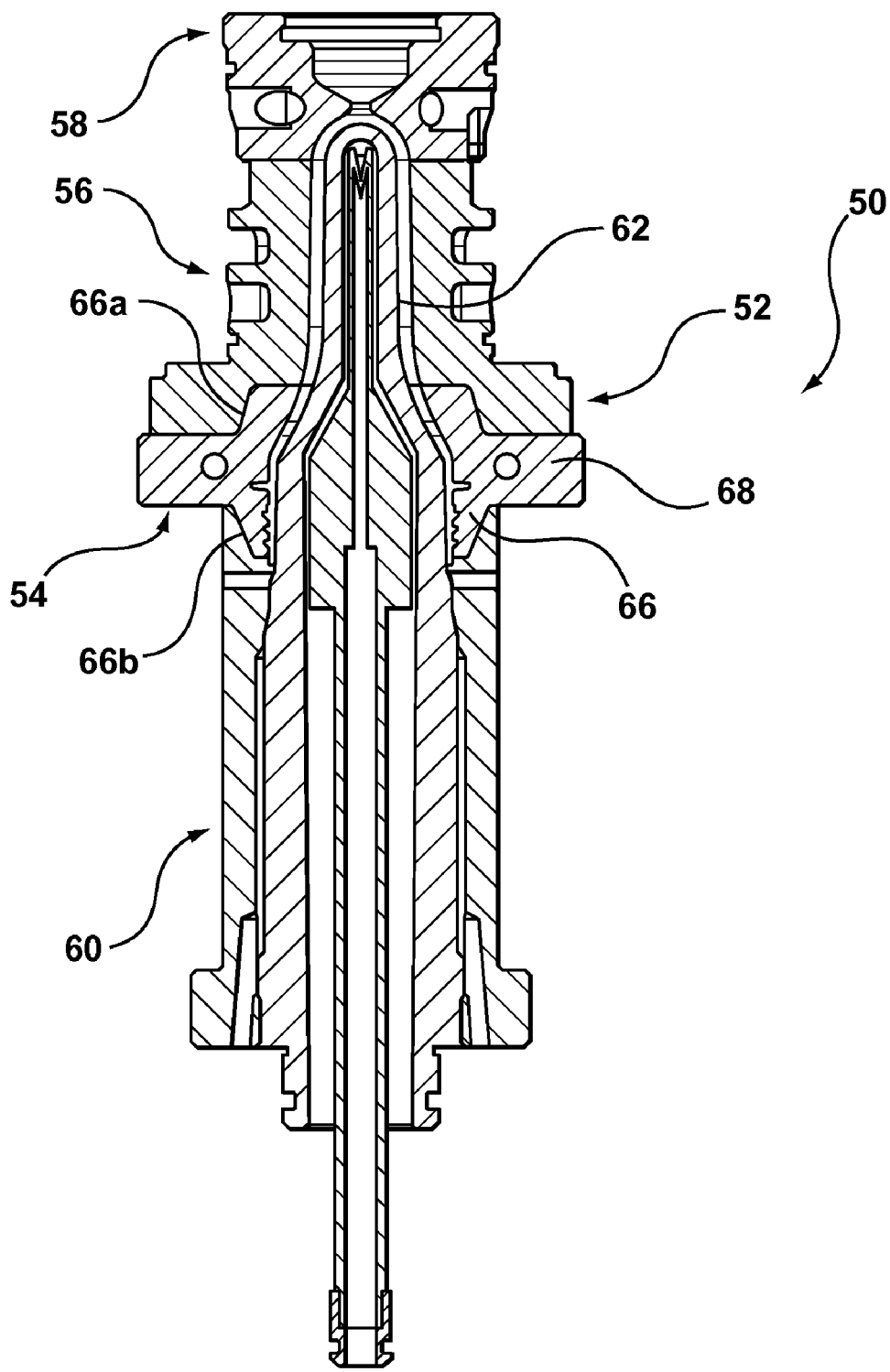
FIG. 1 is a cross-section view of a portion of an injection mold 50 that incorporates a typical molding insert stack assembly 52, implemented in accordance with known techniques.

Embodiments of the present invention have been developed based on inventors' appreciation that there exists at least one problem associated with known mold stacks (such as, for example, molding insert stack assembly 52 of FIG. 1). Using an example of the typical molding insert stack assembly 52 of FIG. 1, it can be clearly seen that the projecting portions 66 (i.e. the top projecting portion 66a and the bottom projecting portion 66b) are formed of comparatively thin metal portions. Due to the recent strive in the industry to shorten cycle times, holding pressure of a holding stage of the molding cycle is being maintained either until or almost until mold opening stage of the molding cycle in order to ensure that contact between the molded article and the mold is substantially maintained during in-mold cooling. Under these circumstances, significant load pressure can be exercised on the top projecting portion 66a and/or the bottom projecting portion 66b in initial instances of the mold opening stage. Due to the fact that the top projecting portion 66a and/or the bottom projecting portion 66b are made of comparatively thin metal portions, this may have negative effects on the top projecting portion 66a and/or the bottom projecting portion 66b. Examples of such negative effects may include increased premature wear, damage due to stress exerted onto the top projecting portion 66a and/or the bottom projecting portion 66b during initial instances of the mold opening stage and the like.

Alternatively or additionally, the comparatively thin top projecting portion 66a and/or bottom projecting portion 66b may prevent designers of the split mold insert pairs 54 from locating cooling channels proximate to those sections of the molding insert stack assembly 52 (i.e. an area proximate to a neck region of the preform being produced), thus, decreasing cooling efficiency in this portion of the molding insert stack assembly 52.

Figure 2:
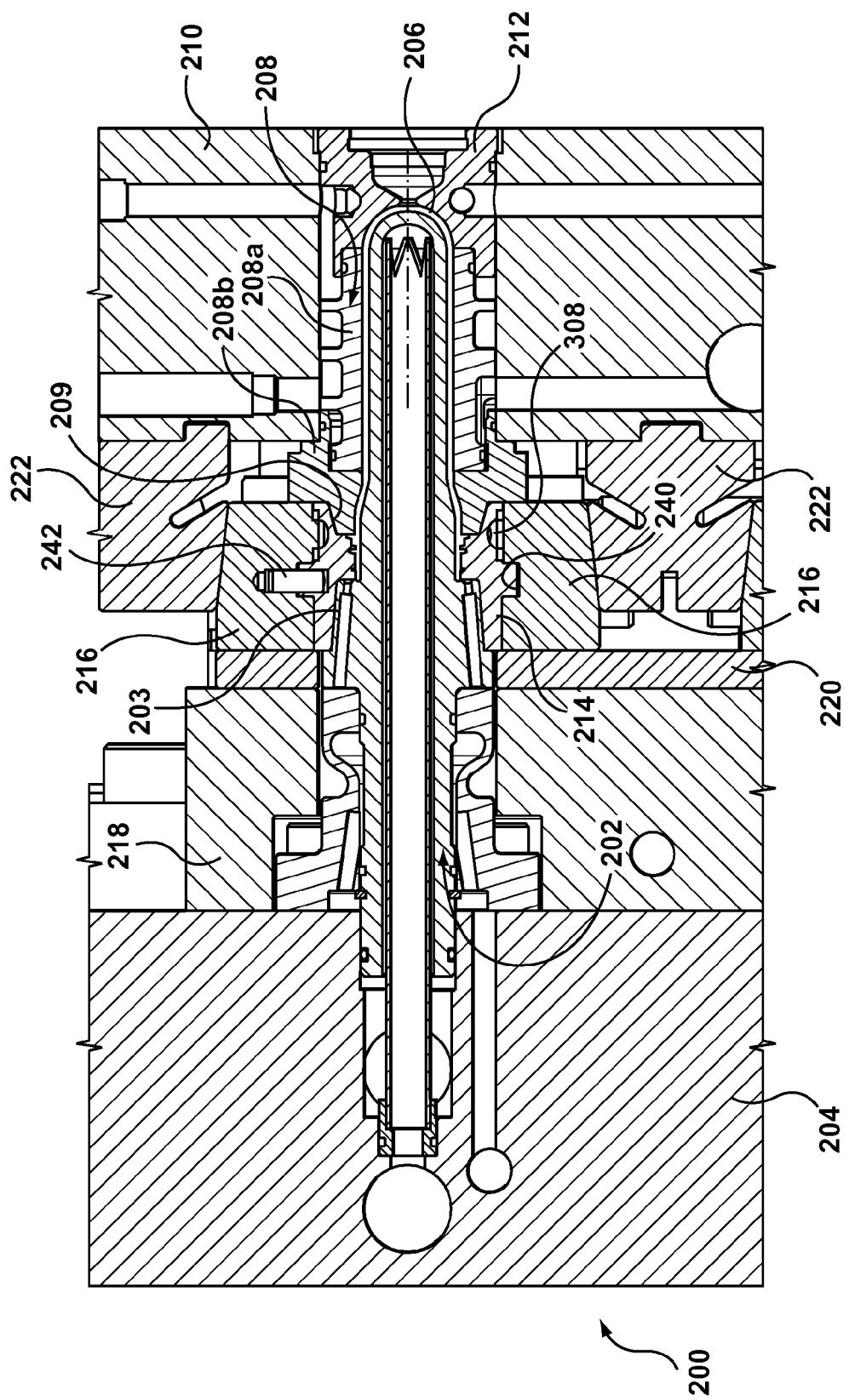
FIG. 2 is a cross-section view of a portion of an injection mold incorporating a mold stack 200 implemented according to a non-limiting embodiment of the present invention.

With reference to FIG. 2, there is depicted a mold stack 200 implemented according to an embodiment of the present invention. Within the illustrated embodiment of FIG. 2, the mold stack 200 is configured for production of a molded article in a form of a preform (not depicted) which is capable of being blow molded into a final-shaped article (such as a bottle and the like). It is worthwhile noting that a mold (not depicted) can incorporate a number of mold stacks similar to the mold stack 200, the number of the mold stacks depending on the desired cavitation (and, therefore, the desired output per molding cycle).

The mold stack 200 comprises a core insert 202 operatively coupled to a core plate 204. A portion of the core insert 202 is configured to define, in use, a first portion of a molding cavity 206. Within the embodiment being depicted herein, the core insert 202 comprises a core body (not separately numbered) and a lock ring (not separately numbered), however, other implementations are also possible. For example, in alternative non-limiting embodiments of the present invention, the core insert 202 can be implemented without a lock ring and the like.

The mold stack 200 further comprises a cavity insert 208 operatively coupled to a cavity plate 210, the cavity insert 208 for defining, in use, a second portion of the molding cavity 206. Within the embodiment being depicted herein, the cavity insert 208 comprises a cavity insert member 208a and a cavity mounting flange 208b. Within the specific non-limiting embodiment being depicted herein, the cavity insert member 208a and the cavity mounting flange 208b are implemented as structurally independent elements, but this need not be so in every embodiment of the present invention. Accordingly, in alternative non-limiting embodiments of the present invention, the cavity insert member 208a and the cavity mounting flange 208b can be implemented as an integrally made element (not depicted). Also, operatively coupled to the cavity plate 210, is a gate insert 212 for defining, in use, a third portion of the molding cavity 206.

Located between the core insert 202 and the cavity insert is a split mold insert pair 214, implemented in accordance with a non-limiting embodiment of the present invention. The split mold insert pair 214 comprises a first split mold insert and a second split mold insert (not separately numbered, but which can be separately referred to as "a split mold insert 214"), each operatively coupled to a respective one of a pair of slides 216. Generally speaking the first split mold insert and the second split mold insert (not separately numbered) of the split mold insert pair 214 cooperate, in use, to define a fourth portion of the molding cavity 206.

Each of the pair of slides 216 is operatively coupled to a stripper plate 218 via a wear plate 220 and gibs (not shown), or other suitable means. The stripper plate 218 is configured to impart movement in an operational (or, in other words, axial) direction of the mold stack 200 to the split mold insert pair 214 by means of a suitable actuator (not depicted), such as an ejector plate, hydraulic actuator and the like. Each of the first split mold insert and the second split mold insert (not separately numbered) of the split mold insert pair 214 is also configured to move in a lateral direction to allow for a neck portion of the molded article to be removed from within the molding cavity 206. This lateral movement can be implemented by any suitable means (not depicted), such as a cam arrangement, a servo motor and the like.

The wear plate 220 is configured to prevent substantial damage to the stripper plate 218 and/or the pair of slides 216 during the lateral movement of the pair of slides 216 vis-à-vis the stripper plate 218. However, it should be noted that in alternative non-limiting embodiments of the present invention, the wear plate 220 can be omitted. This is particularly true in those embodiments of the present invention, where the pair of slides 216 can be lifted vis-à-vis the stripper plate 218 during the lateral motion of the pair of slides 216. An example of such a solution is disclosed in a co-owned US patent application 2007/0212443 published on Sep. 13, 2007, content of which is hereby incorporated by reference in its entirety.

Each of the pair of slides 216 is associated with a respective retaining structure 222. Generally speaking, the purpose of the retaining structure 222 is to maintain, in use, in an operational closed configuration the respective one of the pair of slides 216. Within the presently illustrated embodiment of FIG. 2, the retaining structure 222 is implemented as a wedge bar that cooperates with the respective one of the pair of slides 216. The wedge bar and the respective one of the pair of slides 216 comprise complementary tapers that cooperate, in use, to maintain, in use, in the operational closed configuration the respective one of the pair of slides 216. It should, however, be understood that retaining structure 222 can be implemented differently, such as but not limited to, as a hydraulic structure (whereby the pair of slides 216 is maintained in the operational closed configuration using pressure of oil), servo motor (whereby the pair of slides 216 is maintained in the operational closed configuration by operating the servo motor into a required position), piezo-electrical member (whereby the pair of slides 216 is maintained in the operational closed configuration by providing an electrical current to the piezo-electrical member to cause it to expand) and the like.

Figure 3:
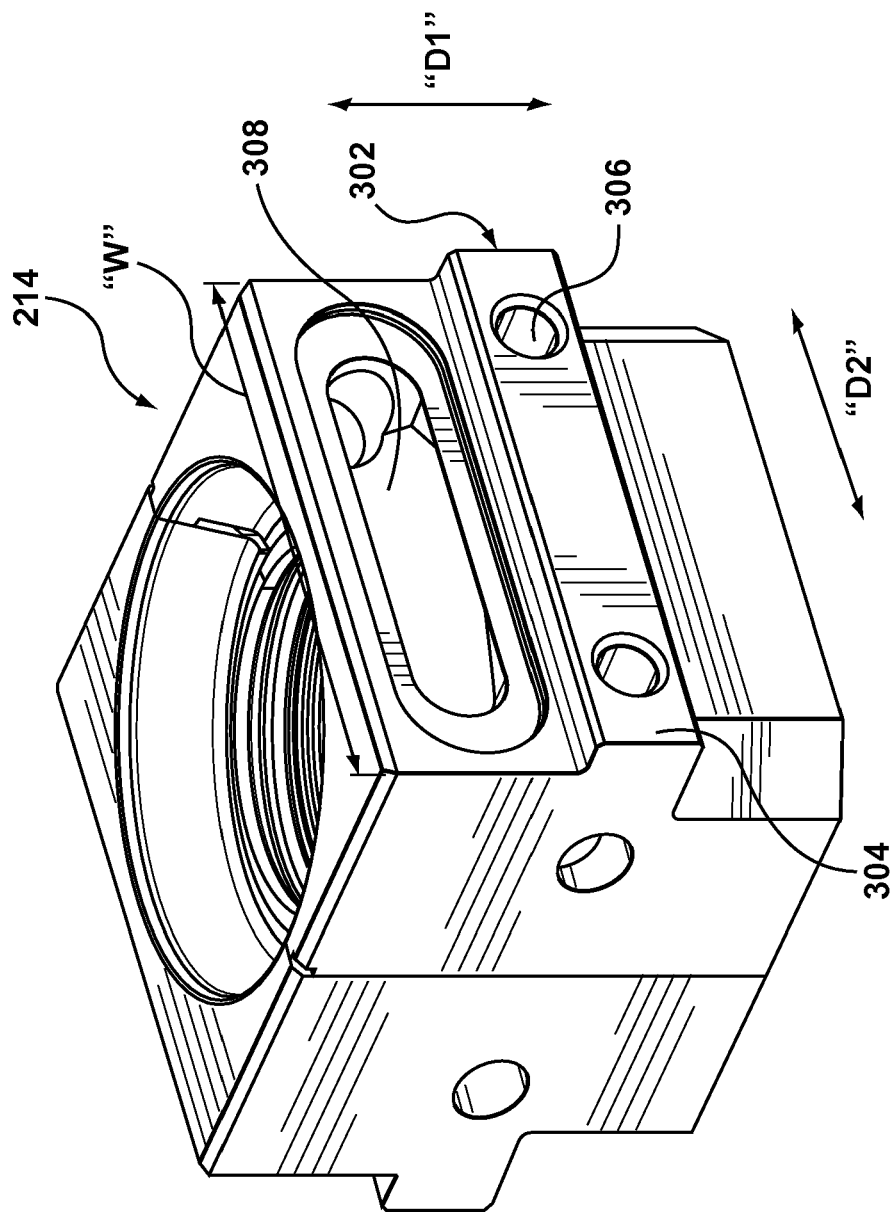
FIG. 3 is a perspective view of a split mold insert pair 214 of the mold stack 200 of FIG. 2, implemented according to a non-limiting embodiment of the present invention.

With reference to FIG. 3, which depicts a perspective view of a non-limiting embodiment of the split mold insert pair 214 of FIG. 2, a specific non-limiting example coupling between the split mold insert pair 214 and the respective one of the pair of slides 216 will now be explained in greater detail. Each of the split mold insert pair 214 comprises a coupling interface 302. The coupling interface 302 comprises a positioning member 304 and a coupling member 306. The positioning member 304 can be implemented as a member having a shape complementary to a positioning interface 240 defined in each of the pair of slides 216 (shown in FIG. 2). The shape of the positioning member 304 and the positioning interface 240 can be complementary in what is commonly referred to as a "key and keyway" arrangement.

Within the specific embodiment being depicted herein, the positioning member 304 can comprise a generally rectangular male member and the positioning interface 240 can comprise a corresponding generally rectangular female member. In alternative non-limiting embodiments of the present invention, the positioning member 304 can comprise a generally rectangular female member and the positioning interface 240 can comprise a corresponding generally rectangular male member. The positioning member 304 and the positioning interface 240 cooperate, in use, to positively locate each of the split mold insert pair 214 in a direction generally depicted in FIG. 3 at "D1".

It should be noted that the positioning member 304 and the positioning interface 240 can be implemented in a number of alternative shapes, such as but not limited to, a trapezoidal shape and the like.

The coupling member 306 can comprise two receptacles for receiving, in use, a coupling structure (not depicted). The coupling structure may include a bolt, a dowel and the like. One non-limiting example of the positioning structure is depicted in FIG. 2 as a dowel 242. Naturally, numerous other types of coupling structures can be used in alternative non-limiting embodiments of the present invention. Furthermore, in alternative non-limiting embodiments of the present invention, other number or other type of receptacles can be used. Additionally or alternatively, the coupling structure (such as the dowel 242) can further assist with positively locating each of the split mold insert pair 214 in a direction generally depicted in FIG. 3 at "D2".

It should be noted that in alternative non-limiting embodiments of the present invention, the coupling interface 302 can be implemented differently. Put another way, in alternative non-limiting embodiments of the present invention, coupling between the split mold insert pair 214 and the respective one of the pair of slides 216 can be implemented differently. For example, the coupling interface 302 can be implemented as a mating surface between the split mold insert pair 214 and the respective one of the pair of slides 216, which can be substantially cylindrical and the like.

Also, as shown in FIG. 3, each of the split mold insert pair 214 comprises a cooling interface 308 for connecting, in use, to a source of coolant (not depicted) via the respective one of the pair of slides 216. Even though not clearly visible in FIG. 3, the cooling interface 308 is coupled to an internal coolant distribution network (not numbered) defined within each of the split mold insert pair 214 for allowing coolant to circulate substantially proximate to a portion of the molded article being formed by the split mold insert pair 214 to allow cooling thereof during an appropriate portion of a molding cycle. Within the non-limiting embodiment being depicted herein, the cooling interface 308 comprises an elongated slot defined along substantially the whole width "W" of each of the split mold insert pair 214. However, in alternative non-limiting embodiments of the present invention, the cooling interface 308 may be implemented differently, such as, two or more discrete apertures and the like.

Figure 4:
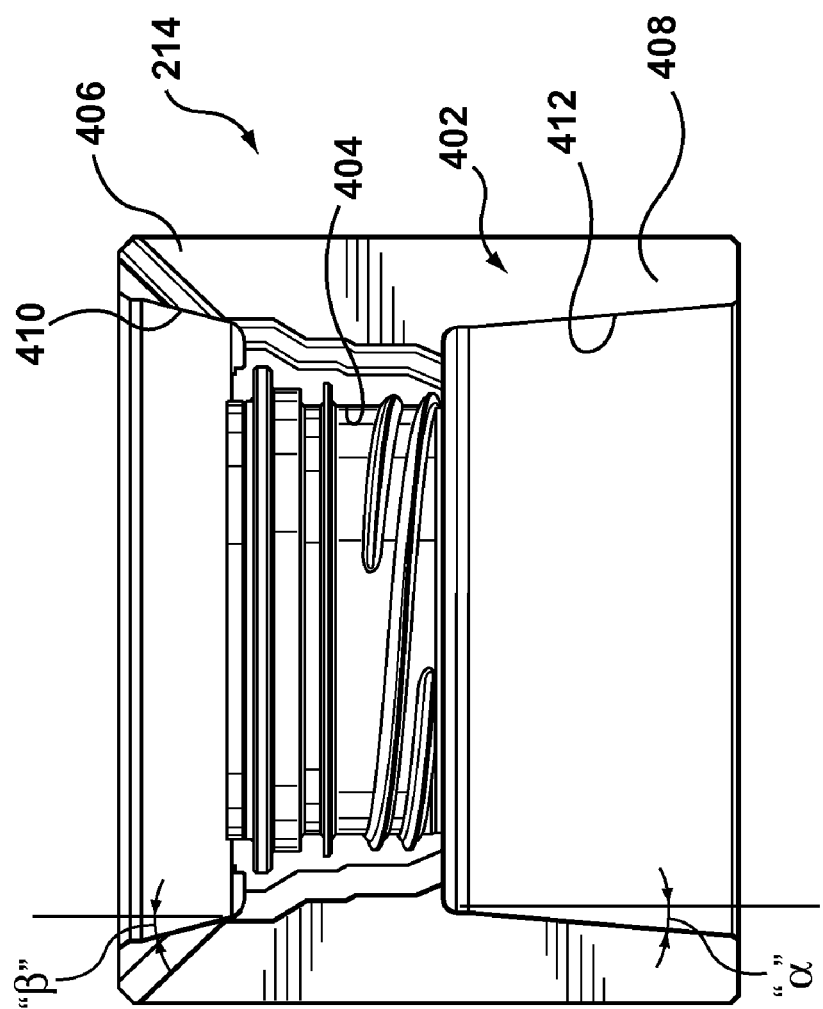
FIG. 4 is a front view of a given one of the split mold insert pair 214 of FIG. 3 at a plane where the given one of the split mold insert pair 214 mates with the other one of the split mold insert pair 214, implemented according to a non-limiting embodiment of the present invention.

With reference to FIG. 4, a non-limiting embodiment of the structure of the split mold insert pair 214 will now be discussed in greater detail. FIG. 4 depicts a front view of a given one of the split mold insert pair 214 at a plane where the given one of the split mold insert pair 214 mates with the other one of the split mold insert pair 214. The given one of the split mold insert pair 214 comprises a body 402. The body 402 comprises a molding cavity defining portion 404, which is configured to define, in use, the aforementioned fourth portion of the molding cavity 206 and, more specifically, at least a portion of a neck region of the molded article produced within the mold stack 200.

The body 402 further comprises a top projecting portion 406 and a bottom projecting portion 408 associated with, respectively, a top portion of the body 402 and a bottom portion of the body 402. The top projecting portion 406 comprises a first female taper portion 410 which cooperates, in use, with a first complementary alignment member of a first mold component. More specifically, the first female taper portion 410 comprises a female taper that cooperates with a first male taper 209 (as is best seen in FIG. 2) associated with the cavity mounting flange 208*b* of the cavity insert 208. The bottom projecting portion 408 comprises a second female taper portion 412 which cooperates, in use, with a second complementary alignment member of a second mold component. More specifically, the second female taper portion 412 comprises a female taper that cooperates with a second male taper 203 (as is best seen in FIG. 2) associated with the core insert 202.

Generally speaking, the purpose of the first female taper portion 410 and the second female taper portion 412 is to align the body 402 during the mold closing stage vis-à-vis the first mold component and the second mold component, respectively. It will be recalled that within embodiments of the present invention, the retaining structure 222 is configured to maintain, in use, in an operational closed configuration the respective one of the pair of slides 216 and, therefore, the attached one or more split mold insert pair 214. Accordingly, it can be said that within embodiments of the present invention, the first female taper portion 410 and the second female taper portion 412 implement exclusively alignment function and the retaining structure 222 implements exclusively locking function.

As is shown in FIG. 4, the female taper of the first female taper portion 410 is associated with a first angle "α" and the female taper of the second female taper portion 412 is associated with a second angle "β". Those of skill in the art will be able to select suitable values for the first angle "α" and the second angle "β", considering, for example, operational stability, ease of manufacturing and the like.

Even though embodiments of the present invention have been described herein above using the cavity insert 208 and the gate insert 212 implemented as structurally separate members, in alternative non-limiting embodiments of the present invention, the cavity insert 208 and the gate insert 212 can be implemented as a structurally integral insert.

Operation of the mold stack 200 of FIG. 2 can be implemented in a substantially similar manner to operation of the prior art mold stacks (such as, for example, the molding insert stack assembly 52 of FIG. 1) and, accordingly, only a brief description of the operation of the mold stack 200 will be presented herein. In FIG. 2, the mold stack 200 is shown in a mold closed position, within which it can be maintained by cooperating platens (ex. a moveable and a fixed platens) under tonnage applied by suitable means (such as, hydraulic, electric means and the like).

Within the mold closed configuration, molding material can be injected into the molding cavity 206 from a hot runner nozzle (not depicted) received within a nozzle receptacle (not separately numbered) defined within the gate insert 212. How the molding material is distributed between an injection unit (not depicted) and the hot runner nozzle (not depicted) can be implemented in a conventional manner. The so-injected molding material is then solidified by means of, for example, coolant being circulated in or around the cavity insert 208, and/or in or around the gate insert 212, and/or in or around the split mold insert pair 214 and/or within the core insert 202.

The mold stack 200 is then actuated into a mold-open position where the molded article (not depicted) can be demolded from within the molding cavity 206. Typically, when the mold stack 200 begins to open, the molded article (not depicted) stays on the core insert 202. Movement of the split mold insert pair 214 in an operational direction causes the molded article (not depicted) be removed from the core insert 202. The split mold insert pair 214 is actuated in a lateral direction (by any suitable means, such as cams, servo motors, etc.) to provide clearance for the neck portion of the molded article (not depicted).

At this point, the mold stack 200 can be actuated into the mold closed condition and a new molding cycle can commence.

A technical effect of embodiments of the present invention can be broadly categorized as a structural-based technical effect. Within the embodiment of FIG. 2, the female tapers (i.e. the first female taper portion 410 and the second female taper portion 412) are configured on split mold elements (i.e. the split mold insert pair 214), while the male tapers are configured on the non-split mold elements (i.e. the cavity mounting flange 208*b* and the core insert 202). Within this configuration, the overall design can be said to be, in use (i.e. in the mold closed arrangement), more structurally stable.

Another technical effect of embodiments of the present invention, can be broadly categorized as a process-based technical effect. More specifically, at least due to the fact that female tapers (i.e. the first female taper portion 410 and the second female taper portion 412) comprise comparatively more material than the prior art design (for example, such as the split mold insert pair 54 of FIG. 1), accordingly the hold time be extended substantially until the mold open phase while minimizing or removing risk of damaging the split mold insert pair 214 due to preload.

Another technical effect of embodiments of the present invention can be broadly categorized as cooling enhancements. More specifically, at least due to the fact that female tapers (i.e. the first female taper portion 410 and the second female taper portion 412) comprise comparatively more material than the prior art design (for example, such as the split mold insert pair 54 of FIG. 1), makers of split mold insert pair 214 have more flexibility for placing the internal coolant distribution network (not numbered) for placing it closer to the surface of the molded article being cooled.

Naturally, it should be expressly understood that not each and every technical effect recited above has to be enjoyed, in its entirety, in each and every embodiment of the present invention.

Description of the non-limiting embodiments of the present inventions provides examples of the present invention, and these examples do not limit the scope of the present invention. It is to be expressly understood that the scope of the present invention is limited by the claims. The concepts described above may be adapted for specific conditions and/or functions, and may be further extended to a variety of other applications that are within the scope of the present invention. Having thus described the non-limiting embodiments of the present invention, it will be apparent that modifications and enhancements are possible without departing from the concepts as described. Therefore, what is to be protected by way of letters patent are limited only by the scope of the following claims:

What is claimed is:

1. A split mold insert for defining, at least partially, a neck area of a preform suitable for blow molding into a final-shaped article, the split mold insert comprising:
   a body having (i) a cavity defining portion for defining, in use, a portion of the neck area and (ii) a top projecting portion and a bottom projecting portion located at opposite sides of the body;
   a first female taper portion associated with the top projecting portion defined on the cavity defining portion face thereof;

a second female taper portion associated with the bottom projecting portion defined on the cavity defining portion face thereof;

the first female taper portion and the second female taper portion for cooperating, in use, with a first male taper of a first mold component and a second male taper of a second mold component, respectively, for performing exclusively aligning function thereby aligning the body into an operational configuration.

2. The split mold insert of claim 1, wherein said first female taper portion is associated with a first angle.

3. The split mold insert of claim 1, wherein said second female taper portion is associated with a second angle.

4. The split mold insert of claim 1, further comprising a coupling interface for coupling the body to an associated slide.

5. The split mold insert of claim 4, wherein said coupling interface is located at an opposite side of the body relative to the cavity defining portion.

6. The split mold insert of claim 4, wherein said coupling interface comprises a positioning member and a coupling member.

7. The split mold insert of claim 6, wherein said positioning member cooperates with a positioning interface defined in the associated slide for positively locating the body relative to the associated slide in a first direction.

8. The split mold insert of claim 6, wherein said coupling member comprises at least one receptacle for receiving a coupling structure.

9. The split mold insert of claim 8, wherein said coupling member is further configured to cooperate with the coupling structure to positively locate the body relative to the associated slide in a second direction.

10. The split mold insert of claim 1, further comprising a cooling interface for connecting to a source of coolant.

11. The split mold insert of claim 10, wherein said cooling interface comprises a slot spanning substantially a whole width of the body.

12. The split mold insert of claim 11, wherein said cooling interface comprises at least two slots.

13. The split mold insert of claim 1, wherein the first female taper portion and the second female taper portion exclusively perform an alignment function.

14. A mold stack comprising:

a core insert configured to define, in use, a first portion of a molding cavity;

a cavity insert configured to define, in use, a second portion of the molding cavity;

a gate insert configured to define, in use, a third portion of the molding cavity;

a split mold insert pair configured to define, in use, a fourth portion of the molding cavity, the split mold insert pair comprising a first split mold insert and a second split mold insert, each having:

a body having (i) a cavity defining portion for defining, in use, a portion of a neck area and (ii) a top projecting portion and a bottom projecting portion located at opposite sides of the body;

a first female taper portion associated with the top projecting portion defined on the cavity defining portion face thereof;

a second female taper portion associated with the bottom projecting portion defined on the cavity defining portion face thereof;

the first female taper portion and the second female taper portion for cooperating, in use, with a first male taper associated with the cavity insert and a second male taper of the core insert, respectively, for performing exclusively aligning function thereby aligning the body into an operational configuration.

15. The mold stack of claim 14, further comprising a pair of slides and wherein each of the split mold insert pair is operatively coupled to a respective one of the pair of slides.

16. The mold stack of claim 15, further comprising a retaining structure configured to maintain in an operational closed configuration the respective one of the pair of slides.

17. The mold stack of claim 16, wherein said retaining structure comprises one of a wedge bar, a hydraulic structure, a servo motor or piezo-electrical member.

18. The mold stack of claim 16, wherein said retaining structure exclusively performs a locking function and the first female taper portion and the second female taper portion exclusively perform an alignment function.

19. The mold stack of claim 15, wherein the body further comprises a coupling interface for coupling the body to the respective one of the pair of slides.

20. The mold stack of claim 19, wherein said coupling interface is located at an opposite side of the body relative to the cavity defining portion.

21. The mold stack of claim 19, wherein said coupling interface comprises a positioning member and a coupling member.

22. The mold stack of claim 21, wherein said positioning member cooperates with a positioning interface defined in the respective one of the pair of slides for positively locating the body relative to the respective one of the of the pair of slides in a first direction.

23. The mold stack of claim 21, wherein said coupling member comprises at least one receptacle for receiving a coupling structure.

24. The mold stack of claim 23, wherein said coupling member is further configured to cooperate with the coupling structure to positively locate the body relative to the respective one of the of the pair of slides in a second direction.

25. The mold stack of claim 14, wherein the body further comprises a cooling interface for connecting to a source of coolant.

* * * * *